United States Patent [19]

Shimizu

[11] 4,134,648

[45] Jan. 16, 1979

[54] MOTION PICTURE CAMERA

[75] Inventor: Ichiro Shimizu, Tokyo, Japan

[73] Assignee: Canon Kabushiki Kaisha, Tokyo, Japan

[21] Appl. No.: 724,453

[22] Filed: Sep. 17, 1976

[30] Foreign Application Priority Data

Sep. 23, 1975 [JP] Japan ................. 50/115046

[51] Int. Cl.² ............................................. G03B 31/02
[52] U.S. Cl. ....................................... 352/27; 352/35; 352/189; 352/190
[58] Field of Search ................... 353/27, 189, 190, 35

[56] References Cited

U.S. PATENT DOCUMENTS

| 1,965,173 | 7/1934 | Canton | 352/27 |
| 2,196,358 | 4/1940 | Heinisch | 352/35 |
| 3,880,504 | 4/1975 | Marvin | 352/27 |
| 3,920,318 | 11/1975 | Frezzolini | 352/35 |
| 3,967,886 | 7/1976 | Komine | 352/27 |
| 4,000,940 | 1/1977 | Komine | 352/27 |

FOREIGN PATENT DOCUMENTS 426322 1/1934 United Kingdom ................. 352/189

Primary Examiner—Monroe H. Hayes
Attorney, Agent, or Firm—Toren, McGeady and Stanger

[57] ABSTRACT

The present invention relates to a motion picture camera which includes a film feeding device for intermittently feeding a film for recording picture information on the film and the sound information on the film exposing part of the film. A sound recording device for recording sound information on the film, and a film constant speed feeding device for feeding the film to the sound recording position of the sound recording device at a constant speed are provided. A driving motor for driving the film constant speed feeding device and a reduction gear mechanism is provided between the driving motor and the film constant speed feeding device, whereby the driving power of the driving motor is transmitted to the film constant speed feeding device through the reduction gear mechanism in such a manner that the film constant speed feeding device is rotated at a constant speed.

2 Claims, 13 Drawing Figures

MOTION PICTURE CAMERA

BACKGROUND OF THE INVENTION

1. Field of the Invention

The present invention relates to a motion picture camera.

2. Description of the Prior Art

Recently in the field of the small motion picture cameras in which an 8 m/m film is used, a film cartridge in which a film is contained and which can be used together with the film contained therein is usually adopted in order to facilitate loading and unloading the film into and out of the camera respectively. To load the film into the camera, the film cartridge is loaded into the cartridge chamber of the camera, and to take the film out of the camera, the film cartridge is taken out of the cartridge chamber. This kind of conventional cartridge is capable of recording only the picture information on the film, being incapable of recording the sound information on the film. However a large number of people now desire that the picture information be recorded simultaneously with the sound information. To accomplish such simultaneous recording another sound recording device which is independent of the motion picture camera for recording the picture information on the film and which can be selectively mounted and dismounted on the motion picture camera is connected to the motion picture camera in such a manner that the picture information and the sound information are recorded simultaneously. Thus the picture information is recorded on the film by means of the motion picture camera while the sound information is recorded on the second recording tape by means of the sound recording device.

However, in case the picture information and the sound information are recorded simultaneously in accordance with the conventional simultaneous sound recording system, both the motion picture camera and the sound recording device must be prepared and separately set up. This reduces the mobility peculiar to the small motion picture camera using 8 m/m film. To always be required to separately bring or carry both the motion picture camera and the sound recording device causes a number of problems to control and handle plural pieces of equipment.

Quite recently however, in order to solve the above mentioned problems a film cartridge containing a film having a sound recording portion so as to be capable of recording the sound information and also being capable of recording the picture information on the same film has appeared in the industry. A motion picture camera capable of recording the sound information and the picture information on the same film simultaneously, namely the so called simultaneous sound recording motion picture camera has also been recently developed.

Examples of the simultaneous film cartridge and the motion picture camera of this kind have been disclosed in U.S. Pat. Nos. 3,782,812; 3,825,327; 3767,294; 3,785,726.

In the film cartridge capable of simultaneous sound recording, as is disclosed in detail in U.S. Pat. No. 3,782,812, apart from the conventional picture recording opening another opening for sound recording is provided, whereby the film is fed to the sound recording opening at a constant speed when the film cartridge is loaded, while by means of the sound recording means, such as a magnetic head the sound information is recorded on the sound recording portion, which can be a magnetic coating provided on the film.

Further the motion picture camera in which a simultaneous sound recording film cartridge is used, can also use the conventional film cartridge which is only capable of recording the picture information.

With the appearance of the simultaneous sound recording film cartridge and the simultaneous sound recording motion picture camera it has become easy to record the sound information and the picture information on the same film simultaneously as well as being able to house the system in a very compact structure in comparison with the conventional system.

However, this simultaneous sound recording motion picture camera includes the sound recording device for recording the sound information in addition to the mechanism of the conventional motion picture camera for only recording the picture information, so that the shape and weight of such a camera has become large in comparison with the conventional motion picture camera so. The ease of mobility, which is one of the features of the small motion picture cameras in which an 8 m/m film is used is somewhat last. The mechanical part of this sound recording device principaly consists of the magnetic head, the head pad, the film guide member, the capstan, the pinch roller, the capstan, driving member, the fly wheel and so on. Of all these elements, the fly wheel is problematic because of its weight and shape.

This sound recording device is so designed that by means of the capstan and the pinch roller the film is fed in such a manner that the film runs across the magnetic head at a constant speed. The film is led to the magnetic head, being guided by means of the film guide part for controlling the running course of the film in such a manner that the sound information recording portion on the film runs by a certain determined position of the magnetic head member, while by means of the magnetic head member the sound information is recorded magnetically on the sound information recording portion on the film.

In this case, the film is fed by means of the capstan and the pinch roller provided behind the magnetic head member, whereby it is essential that the film runs by the magnetic head member always at a constant speed. Thus the rotation speed of the capstan shaft for feeding the film must be constant, namely of an equal angular speed. Therefore the capstan shaft is normally provided with a fly wheel so as to absorb small fluctuations of transmitted energy, minimizing the speed fluctuation during one rotation.

The effect of this fly wheel is represented by the moment of inertia. The larger the moment of inertia, the more speed fluctuation. Energy fluctuation is absorbed during one rotation in such a manner that the rotation is kept as nearly constant as possible. In order to increase the moment of inertia of this fly wheel, it is essential to increase the diameter and the weight of the fly wheel itself. However, this also increases the shape and the weight of the camera itself. This makes the small motion picture camera, in which an 8 m/m is used, lose its mobility which is one of the features of such a motion picture camera. This is an inevitable problem when the fly wheel is used in order to avoid the speed fluctuation.

Further as a problem peculiar to the simultaneous sound recording motion picture camera, the film has to be fed across the magnetic head member at a constant speed while the film is fed intermittently by means of the film feeding claw across the exposure opening for recording the picture information. As a result, it is possible that the film feeding at a constant speed could be influenced by the speed fluctuation due to the vibration arising from the intermittent feeding of the film. Further it is possible that the film feeding at a constant speed could be influenced by the elongation of the belt for transmitting the power from the driving motor to the capstan and by the precision of the capstan and of the rotary part for rotatably supporting the capstan.

In view of the foregoing, if it is possible to find a method to rotate the capstan shaft at an equal angular speed instead of the method of rotating the capstan shaft by means of the belt through the fly wheel, and also to find a method of eliminating the undesired influence of the intermittent movement of the film upon the sound recording, the characteristics of the motion picture can be utilized to its best advantage without losing the efficiency of the simultaneous sound recording motion picture camera.

SUMMARY OF THE INVENTION

A principal object of the present invention is to provide a motion picture camera capable of simultaneous sound recording, having a film feeding mechanism for feeding the film at a constant speed by means of a capstan shaft and a pinch roller, so designed that the motion picture camera includes a constant speed mechanism for rotating the capstan at a constant speed although the shape and the weight of the fly wheel are smaller than those of the fly wheel of the conventional motion picture camera capable of simultaneous sound recording, whereby as the means for rotating the capstan at a constant speed a power transmission gear line is provided between the fly wheel and the driving motor without using a power transmission belt for transmitting power from the driving motor.

Further, another object of the present invention is to provide a motion picture camera so designed that between the feeding mechanism for intermittently feeding the film and the feeding mechanism for continuously feeding the film a device is provided for preventing undesired influence upon the film being continuously fed by the continuous film feeding mechanism, even though the film is vibrated by the intermittent film feeding mechanism.

Further, another object of the present invention is to provide a motion picture camera which has a compact construction.

Further, another object of the present invention is to provide a motion picture camera which has a light weight construction.

Other objects, features and advantages of the present invention will be apparent from the description of the embodiments of the invention to be made in detail in accordance with the accompanying drawings.

BRIEF DESCRIPTION OF THE DRAWINGS:

FIG. 2a is a partial side view, and FIG. 2b is a bottom view showing the structure of the cartridge shown in FIG. 1 near the film exposing opening.

DESCRIPTION OF THE PREFERRED EMBODIMENT:

The present invention will be explained in detail in accordance with the accompanying drawings relative to several embodiments of the motion picture camera in accordance with the present invention.

Figure 1:
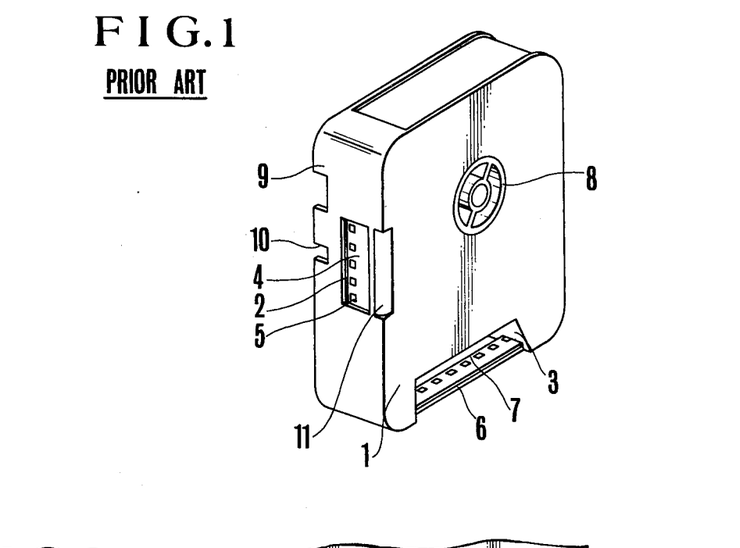
FIG. 1 is a perspective view showing a conventional film cartridge capable of simultaneous recording of picture information and second information, containing a film having a sound information recording portion.

FIG. 1 shows in perspective view a film cartridge capable of simultaneous recording of picture information and sound information, containing a film having a magnetic sound information recording portion. This type of film cartridge is known in the art and has already been disclosed for example by the U.S. Pat. No. 3,782,812.

In FIG. 1, 1 is the cartridge body, 2 the opening for exposing film, 3 the cartridge opening for sound recording, 4 the film, 5 the film perforation, 6 the magnetic portion for sound recording coated on the film 4, 7 the remaining portion of the film from the magnetic coating portion 6, 8 the film winding up shaft, 9 the notch for indicating the sensitivity of the film and 10 the guide for positioning the film.

FIGS. 2(a) and 2(b) show the structure near the film exposing opening 3 of the film cartridge shown in FIG. 1.

Figure 2:
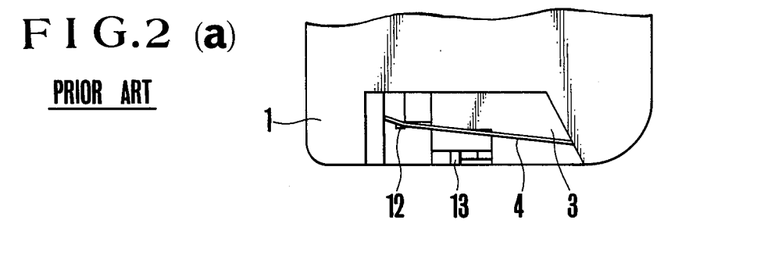

In FIG. 2, 12 is the projection to be engaged in the hole 4a provided near the end of the film for preventing further winding up of the film when the film is finished, and 13 the stopper for preventing the film loop from hanging downwards at the film exposure opening 3 during the film feeding.

FIG. 3(a) shows the sound recording device for the conventional simultaneous sound recording camera.

FIG. 3(b) shows a section along the line A—A of the sound recording mechanism of the sound recording device shown in FIG. 3(a).

Figure 3:
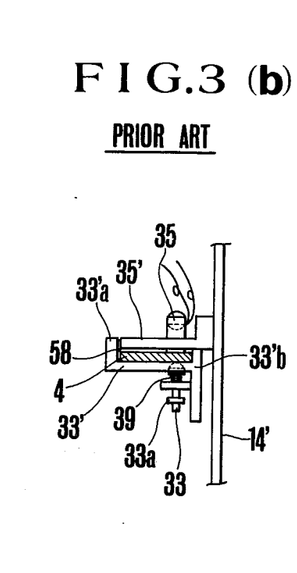
FIG. 3(a) is an elevational view showing the sound recording device for the conventional simultaneous sound recording camera.
FIG. 3(b) is a section along the line A—A of the sound recording mechanism of the sound recording device shown in FIG. 3(a)

In FIG. 3, 4 is the film appearing at the opening 3 for the sound recording of the film in cartridge 1 shown in FIGS. 1 and 2. 16' is the motor secured on the camera body 14', 36' the pulley secured on the shaft 16'a of the motor 16', 21' the capstan shaft rotatably provided on the camera body 14' and 40 the fly wheel secured on the capstan shaft 21' whereby the circumference of the fly wheel is provided with the groove for the belt 37 to be provided between the pulley 36 and the fly wheel 40. 22' is the pinch roller provided on the other side of the film with reference to the capstan shaft 21', whereby the pinch roller 22' consists of for example, rubber having a large friction coefficient, being secured on the rotary shaft 22'a rotatably provided on the not shown pinch roller moving member rotatably provided on the camera body 14' in such a manner that the pinch roller is selectively brought into a position at which the film 4 which has been departed largely from the capstan shaft 21' under the control of the pinch roller moving member can easily be unloaded and loaded when the film cartridge 1 is to be taken out of the cartridge chamber respectively to be put into the cartridge chamber or into a position at which the pinch roller is brought into a functional contact with the capstan shaft 21' through the film 4 under the control of the pinch roller moving member when the film cartridge 1 has been loaded in the cartridge chamber (FIG. 3(a)). 35 is the magnetic head member electrically connected to the sound recording circuit provided in the camera body, whereby the magnetic head member 35 is secured on the camera body 14' through the magnetic head holding member 35' in the cartridge chamber. 33 is the head pad member provided at the other side of the magnetic head member 35 with reference to the film 4 so as to bring the magnetic coating portion 6 for sound recording of the film 4 running by the magnetic head member 35 into contact with the magnetic head member 35, whereby the head pad member 33 is born by the head pad moving member 33' rotatably provided on the camera body 14' in such a manner that the head pad member is selectively brought into a position at which the film 4 which has been departed largely from the magnetic head member 35 under the control of the head pad moving member 33' can easily be unloaded respectively loaded when the film cartridge 1 is to be taken out of the cartridge chamber respectively to be put into the cartridge chamber or into a position at which the film 4 is brought into a functional contact with the magnetic head member 35 under the control of the head pad moving member 33' when the film cartridge 1 has been loaded in the cartridge chamber. 39 is a spring for normally urging the head pad member 33 along the direction toward the magnetic head member 35. 33a is a control member for controlling the displacement of the head pad member 33 toward the magnetic head member 33. Further, the parts 33'a and 33'b of the head pad moving member 33' constitute the film guide part 58, whereby the □-shaped film guide part 58 is formed as is shown in detail in FIG. 3(b) by means of the magnetic head holding member 35' and the head pad moving member 33' when the magnetic head member 35 and the head pad member 33 are brought into functional contact with each other.

With reference to the rotation of the capstan shaft in the sound recording part of the conventional simultaneous sound recording camera structured as mentioned above, the rotation of the motor 16' is transmitted to the fly wheel through the motor shaft 16'a, the pulley 36 and the belt 37. The variation of energy due to the elongation and the vibration of the belt is absorbed at the fly wheel 40 while the capstan shaft 21' is rotated as one body with the fly wheel 40. To obtain rotation of the capstan 21' at a more constant angular speed, it is necessary to make the moment of inertia of the fly wheel larger, namely the diameter and the weight of the fly wheel larger so that the shape and the weight of the camera are necessarily made larger, which is problematic.

Figure 4:
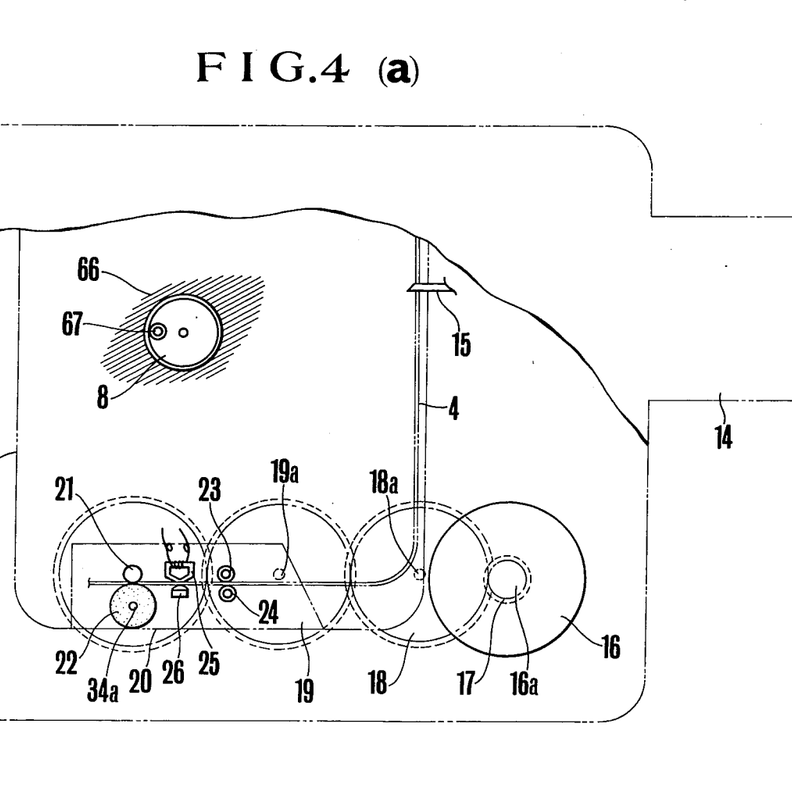
FIG. 4(a) is an elevational view showing a means for rotating the capstan shaft at a constant angular speed, by making use of one gear for each shaft instead of a fly wheel as the method for driving the capstan shaft at a constant angular speed in accordance with one embodiment of the simultaneous sound recording camera of the present invention.
FIG. 4(b) is an elevational view illustrating the arrangement and the composition of the sound recording means, the film guide means, the means for feeding a film at a constant speed etc. in the state of operation shown in FIG. 4(a)
FIG. 4(c) is an elevational view illustrating the arrangement of the sound recording means, the film guide means, the means for feeding a film at a constant speed, etc. when the camera shown in FIG. 4(b) has been brought out of the operable state into the non-operable state.
FIG. 4(d) is a sectional view taken along line B—B in FIG. 4(b) showing the film guide means shown in FIG. 4 (a), (b) and (c)

FIGS. 4(i a), 4(b), 4(c) and 4(d) show an embodiment of the simultaneous sound recording camera in accordance with the present invention. FIG. 4(a) shows a means for rotating the capstan shaft at a constant angular speed, by making use of one gear for each shaft instead of using a fly wheel as the method for driving the capstan shaft at a constant angular speed. FIG. 4(a) further shows the camera in an operable state, whereby the film cartridge shown in FIGS. 1 and 2 is loaded in the cartridge chamber of the camera body 14. FIG. 4(b) shows the arrangement of the sound recording means, the film guide means, the means for feeding a film at a constant speed and so on in the state of operation shown in FIG. 4(a). FIG. 4(c) shows the arrangement of the second recording means, the film guide means, the means for feeding a film at a constant speed and so on when the camera shown in FIG. 4(b) has been brought out of the operable state into the non-operable state. FIG. 4(d) shows the film guide means shown in FIG. 4(a), (b) and (c), in a section along the line B—B in FIG. 4(b).

In FIG. 4, 15 is the film feeding claw to be selectively engaged in the perforation 5 of the film 4 appearing at the film exposing opening 2 of the film cartridge 1 loaded in the cartridge chamber of the camera body 14 so as to intermittently feed the film 4 to the film exposing part of the camera successively. The feeding claw 15 is driven by the not shown film feeding claw driving motor secured in the camera body. 66 is the film chamber wall in the film cartridge 1. 67 is the film winding up claw provided in the camera body 14. The film winding up claw is engaged with a part of the film winding up shaft 8 of the film cartridge 1, when the film cartridge 1 is loaded in the cartridge chamber of the camera body 14 in such a manner that the film winding up shaft 8 is rotated by the driving power of the driving motor driving the intermittent film feeding claw 15 when the camera is in operation, so as to wind up on the film winding up shaft 8 the film on which the picture information as well as the sound information has already been recorded. 27 is the cover of the cartridge chamber provided on a part of the camera body 14 by means of a hinge so as to be opened and closed in order to selectively cover the opening of the cartridge chamber of the camera body 14. 16 is the driving motor secured on the camera body, whereby the driving motor is intended to drive the film constant speed feeding means for driving the film at a constant speed at the sound recording means. 17 is the gear secured on the motor shaft 16a of the motor 16, and 18 the idle gear rotatably provided on the camera body 14 whereby the idle gear 18 and the gear 17 are in engagement with each other. 19 is the idle gear secured on the rotary shaft 19a rotatably provided on the camera body 14. The idle gear 19 is in engagement with the idle gear 18. 21 is the capstan shaft rotatably provided on the camera body 14 and 20 the gear secured on the capstan shaft 21 so as to be rotated as one body with the capstan shaft 21, the gear 20 being in engagement with the idle gear 19. In operation the capstan shaft 21 is rotated at a constant angular speed while the rotation of the motor 16 is transmitted through the gear 17, the idle gears 18, 19 and the gear 20. 22 is the pinch roller constituting the film constant speed feeding means togehter with the capstan shaft 21. The pinch roller 22 consists of rubber or the like with remarkably large friction coefficient, and is rotatably provided at the other side of the capstan shaft 21 with regard to the film 4. Further the pinch roller 22 is secured on the rotary shaft 34a rotatably provided on the pinch roller moving member 34 (FIG. 4 (b) and (c)) rotatably provided on the camera body 14 in such a manner that the pinch roller is selectively brought into a position at which the pinch roller is largely departed from the capstan shaft 34 under the control of the pinch roller moving member 34 so as to facilitate the loading and the unloading of the film when the film cartridge 1 is put in the cartridge chamber, and taken out of the cartridge chamber respectively and into a position at which the pinch roller is brought into functional contact with the capstan shaft 21 through the film 4 under the control of the pinch roller control member 34. 25 is the magnetic head member electrically connected to the sound recording circuit provided in the camera body 14, the magnetic head member 25 is secured in the cartridge chamber. A not shown sound pick up microphone is connected to the sound recording circuit. The sound picked up by the sound pick up microphone is applied to the magnetic head member 25 as electrical signals through the sound recording circuit in such a manner that the sound information signals are recorded as magnetic signals on the sound recording magnetic coating 6 of the film by means of the magnetic head member 25. 26 is the head pad member provided at the other side of the magnetic head member with respect to the film so as to bring the sound recording magnetic coating 6 of the film 4 running by the magnetic head member 25 in contact with the magnetic head member 25. 23 is the guide roller secured on the shaft 23a rotatably provided on the camera body 14 and 24 the guide roller constituting the film guide means together with the guide roller 23. 28 is the rotation member rotatably provided on the shaft 60 secured on the camera body 14. The rotation member 28 carries the guide roller 24 on the shaft 24a rotatably provided on the rotation member 28 and the head pad member 26. 61 is the spring for normally urging the head pad member 26 toward the magnetic head member 25 and 26a the control member for controlling the displacement of the head pad member 26 toward the magnetic head pad member 25. 31 is the spring for urging the rotation member 28 in a counter-clockwise direction. 32 is the slide member to be slided, being guided by means of the screw 62 provided on the camera body, whereby the slide member 32 is normally urged by means of the spring 33 with a larger strength than that of the spring 61 toward the cover 27 of the cartridge chamber in such a manner that the slide member 32 is displaced to the right by means of the cover 27 of the cartridge chamber when the opening of the cartridge chamber is covered by the cover 27 as is shown in FIG. 4(b). The slide member 32 is displaced to the left when the opening of the cartridge chamber is not covered by the cover 27.

The operation of the simultaneous sound recording camera as described above in accordance with the present invention will now be explained.

FIG. 4(c) shows the state in which the opening of the cartridge chamber is not covered by the cover 27 of the cartridge chamber. In this state the slide member 32 has been displaced to the left by means of the strength of the spring 33. When the slide member 32 is displaced to the left, a part of the slide member 32 is engaged with a part of the rotation member 28, causing the rotation member 28 to pivot in the counter-clockwise direction against the strength of the spring 31 because the spring 33 is stronger than the spring 31. The head pad member 26 and the guide roller 24 are largely disengaged from the magnetic head member 25 and the guide roller 23. The pinch roller moving member 34 so designed as to be displaced in functional engagement with the displacement of the rotation member 28 along the clockwise direction is also pivoted in a counter-clockwise direction in such a manner that the pinch roller 22 is disengaged from the capstan shaft 21. In this state the capstan shaft 21 is largely disengaged from the pinch roller 22 while the magnetic head member 25 is also largely disengaged from the head pad member 26 and the guide roller 23 is also largely disengaged from the guide roller 24 so that the film 4 can be loaded and unloaded with ease.

When then the opening of the cartridge chamber is closed by means of the cover 27 of the cartridge chamber as is shown in FIG. 4(b) after the film cartridge 1 has been loaded in the cartridge chamber, the slide member 32 is displaced to the right by means of the pressing strength of the cover 27 of the cartridge chamber against the strength of the spring 33. When the slide member 32 is displaced to the right, the engagement of a part of the slide member with a part of the rotation member 28 is released. Rotation member 28 is allowed to pivot in the counter-clockwise direction by means of the strength of the spring 31 in such a manner that the head pad member 26 and the guide roller 24 are brought into functional contact with the magnetic head member 25 and the guide roller 23. The pinch roller moving member 34 so designed as to be displaced into functional engagement with the displacement of the rotation member 28 in the counter-clockwise direction is also rotated along the clockwise direction in such a manner that the pinch roller 22 is brought into the functional contact with the capstan shaft 21, namely the state as is shown in FIG. 4(a) and (b) is assumed. Further when the guide roller 23 is brought into functional contact with the guide roller 24, the film 4 is clamped between the guide rollers 23 and 24 as is shown in FIG. 4(d) so as to prevent the film 4 from moving along the axial direction.

In the state shown in FIG. 4(a) and (b), the film 4 loaded in the film cartridge 1 is fed downwards by means of the film feeding claw 15 and is then run so as to be wound up on the film winding up shaft 8 through the film guide means consisting of the guide rollers 23 and 24, the sound recording means consisting of the magnetic head member 25 and the head pad member 26, and the film constant speed feeding means consisting of the capstan shaft 21 and the pinch roller 22.

When the camera is operated, the film feeding claw driving motor and the motor 16 are driven. When the not shown film feeding claw driving motor is driven the film feeding claw 15 is selectively engaged in the perforations of the film 4 appearing at the film exposing opening 2 of the film cartridge 1 so as to intermittently feed the film to the exposure part of the camera successively. When the other motor 16 is driven, the rotation of the motor 16 is transmitted to the capstan shaft 21 through the gears 17, 18, 19 and 20 so as to rotate the capstan shaft 21 at a constant speed. When the capstan shaft 21 is rotated at a constant speed, by means of the capstan shaft and the pinch roller 22 in functional contact with capstan shaft 21 the film 4 is fed toward the film winding up shaft 8, running between the magnetic head member 25 and the head pad member 26 at a constant speed. In this way, the film 4 fed by means of the capstan shaft 21 and the pinch roller 22 is wound up on the film winding up shaft 8.

As explained above, the fact that the gear transmits an exact rotating movement is taken into consideration in such a manner that the driving power for driving the capstan shaft 21 at a constant speed is transmitted to the capstan shaft 21 from the motor 16 through the gears 17, 18, 19 and 20 instead of using a fly wheel. As a result, a superior sound recording efficiency can be achieved without loosing any mobility while the film 4 is clamped between the two rotatable rollers 23 and 24 at the film guide part with a constant strength so that when the film 4 is intermittently fed by the film feeding claw 15 the vibration given to the film 4 by the film feeding claw 15 is removed so as to improve the sound recording efficiency.

FIGS. 5(a) and 5(b) show a variation of the film constant speed feeding means of a motion picture camera capable of simultaneous sound recording in accordance with the present invention. These figures illustrate the important elements of the invention as shown in FIG. 4, wherein like elements are identified by like reference numerals.

Figure 5:
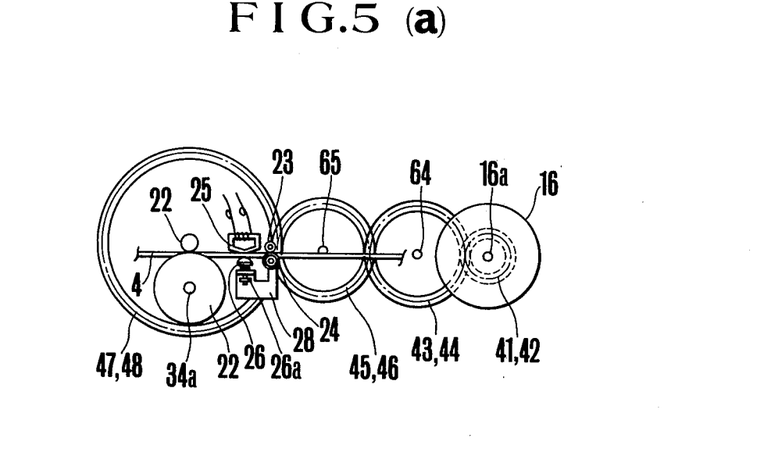
FIG. 5(a) is an elevational view and FIG. 5(b) is a side view showing a variation of the constant speed feeding means of the motion picture camera capable of simultaneous sound recording in accordance with the present invention.

In FIG. 5, 41 and 42 are the gears secured on the shaft 16a of the motor 16 and 63 the stopper for preventing the thrust displacement of the gears 41 and 42 along the axial direction. 43 and 44 are the idle gears secured on the rotary shaft 64 rotatably provided on the camera body. The idle gear 43 is engaged with the gear 41 while the idle gear 44 is engaged with the gear 42. 45 and 46 are the idle gears secured on the rotary shaft 65 rotatably provided on the camera body 14. The idle gear 45 is engaged with the idle gear 43 while the idle gear 46 is engaged with the idle gear 44. 47 and 48 are the gears secured on the capstan shaft 21 rotatably provided on the camera body 14. The gear 47 is engaged with the idle gear 45 while the gear 48 is engaged with the idle gear 46. Further, in the arrangment of these gears, the teeth of the gears on the same axis are shifted by a half pitch mutually to each other.

When the capstan shaft 21 is rotated in the above mentioned disposition, the rotation of the driven motor 16 is transmitted to the capstan shaft 21 through the gears 41, 43, 45 and 47 and the gears 42, 44, 46 and 48 so as to rotate the capstan shaft 21 at a constant angular speed.

In this arrangement the load for one gear is reduced in comparison with that of the embodiment shown in FIG. 4. Because the gears on the same shaft are shifted by a half pitch mutually to each other, the module is also reduced by ½ so that the fluctuation of the load for one gear is reduced in such a manner that the capstan shaft 21 can be rotated at a constant angular speed more smoothly, which is desirable.

Figure 6:
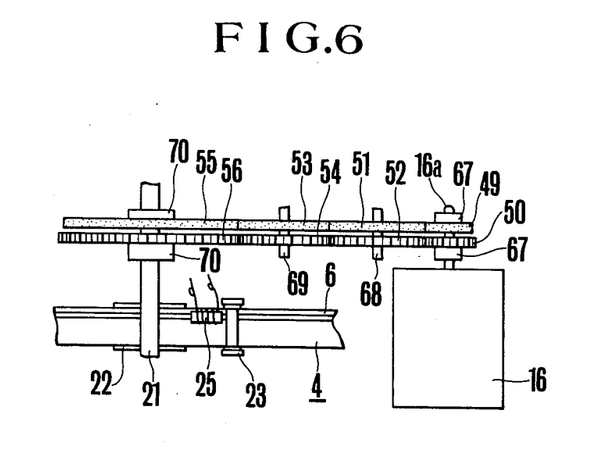
FIG. 6 shows a variation of the constant speed feeding means of the motion picture camera capable of simultaneous sound recording in accordance with the present invention as shown in FIGS. 4 to 5.

FIG. 6 shows another variation of the film constant speed feeding means of the motion picture camera capable of the simultaneous sound recording in accordance with the present invention shown in FIGS. 4 and 5 and the principal members provided in the neighborhood of the film constant speed feeding means. Like members are also identified by like reference numerals as those used in FIGS. 4 and 5. 49 is a disc-shaped rubber roller secured on the shaft 16a of the motor 16, and 50 a gear secured also on the shaft 16a of the motor 16. 51 is a disc-shaped rubber roller secured on the rotary shaft 68 rotatably provided on the camera body 14 and 52 a gear secured also on the rotary shaft 68. The rubber roller 51 is in frictional engagement with the rubber roller 49, while the gear 52 is engaged with the gear 50. 53 is disc-shaped rubber roller secured on the rotary shaft 69 rotatably provided on the camera body 14 and 54 a gear secured also on the rotary shaft 69. The rubber roller 53 is in frictional engagement with the rubber roller 51 while the gear 54 is engaged with the gear 52. 55 is a disc-shaped rubber roller secured on the capstan shaft 21 rotatably provided on the camera body 14 and 61 a gear secured also on the capstan shaft 21. The rubber roller 55 is in frictional engagement with the rubber roller 53 while the gear 56 is engaged with the gear 54.

When the capstan shaft 21 is rotated in the above mentioned arrangement, the rotation of the motor 16 is transmitted to the capstan shaft 21 through the rubber rollers 49, 51, 53 and 55 and the gears 50, 52, 54 and 56 so as to rotate the capstan shaft 21 at a constant speed.

The external diameter of the rubber rollers 49, 51, 53 and 55 is chosen a little larger than that of the gears 50, 52, 54 and 56.

In accordance with this embodiment a little fluctuation of the speed of the gears 50, 52, 54 and 56 as well as their vibration is absorbed by the rubber rollers 49, 51, 53 and 55 in such a manner that the capstan shaft 21 can be driven at a constant speed smoothly in comparison with the embodiment shown in FIGS. 4 and 5, which is desirable.

Figure 7:
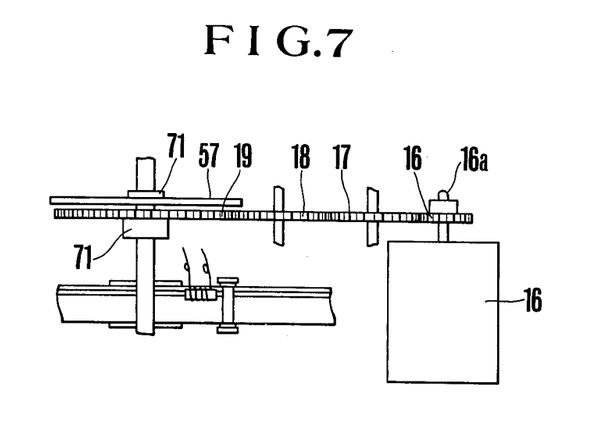
FIG. 7 shows another variation of the constant speed feeding means of the motion picture camera capable of simultaneous sound recording in accordance with the present invention as shown in FIG. 4.

FIG. 7 shows an embodiment of the film constant speed feeding means of the motion picture camera capable of the simultaneous sound recording in accordance with the present invention shown in FIG. 4, whereby the mechanism of the film constant speed feeding means remains unchanged while on the capstan shaft 21 only a fly wheel, whose external diameter and whose weight are remarkably smaller than those of the fly wheel of the film constant speed feeding means shown in FIG. 3, is secured. In the drawing, 71 is the stopper for preventing the thrust displacement of the fly wheel 57 and the gear 19.

In accordance with this embodiment the capstan shaft 21 can be rotated at a constant speed more smoothly, by making use of the gears and the fly wheel more efficiently.

As explained above the present invention relates to a motion picture camera capable of the simultaneous sound recording having a film constant speed feeding means so designed that, the fact that the gears carry out a precise rotation, the driving power for rotating the capstan shaft at a constant speed is transmitted to the capstan shaft from the motor through the gears without using any fly wheel or even if a fly wheel is used, no importance is put on the fly wheel and a small fly wheel is used, so that a motion picture camera with such portability and mobility can be realized in accordance with the present invention. Further the film guide part is so designed that the film is clamped with a certain determined strength between the two rotary rollers, so that when the film is intermittently fed by means of the film feeding claw the vibration given from the film feeding claw to the film can be removed. Thus, a motion picture camera capable of efficient simultaneous sound recording can be realized.

Further the deviation of the speed can be recognized from the pulse interval of the light by projecting the light to the teeth of the gear in rotation so as to check the reflected light. In this way the speed control power source can be checked. Further when plastic gears are used, not only the weight can be reduced but also the variation of the load from outside can be absorbed by means of the elasticity of plastic while noise due to the engagement between gears can be reduced. Further, the noise can be remarkably reduced when helical gears are made use of.

What is claimed is:

1. A sound motion picture camera for use with a sound film, comprising:
   (a) a casing having:
       a film chamber for receiving the film, said chamber having a picture image recording location for recording picture image information on the film and a sound recording location for recording sound information on the film; and an image gate being opened at a position opposite to the image recording location of the chamber;
   (b) first feed means in said chamber engageable with the inserted film at said picture image recording location for intermittently transporting said film in a direction of said sound recording location along a film path of said image gate in said image recording location;
   (c) sound recording means in said chamber positioned for co-operation with the inserted film at said sound recording location;
   (d) second feed means in said chamber engageable with the inserted film at said sound recording location for transporting the film part at said sound recording means at a substantially constant speed, said second feed means having:
       a capstan positioned within the sound recording location; and
       a pinch roller positioned opposite to said capstan sandwiching the film path of said sound recording location;
   (e) drive means for actuating said first and second feed means, said drive means including at least a motor rotating at a substantially constant speed;
   (f) means for transmitting the driving power of said motor to said capstan, having first gear means functionally fixed on a rotating shaft of said motor and rotating integrally with the rotating shaft, and second gear means being engaged with said first gear means, said second gear means functionally fixed on a rotating shaft of said capstan and rotating integrally with the capstan;
   (g) first elastic disc means integrally rotating with the first gear means; and
   (h) second elastic disc means integrally rotating with the second gear means, said second elastic disc means being resiliently contacted with said first elastic disc means;
   said first and second elastic disc means thus being arranged to absorb backlash that takes place between said first and second gear means so as to allow said capstan to be rotated by the driving power of said motor at approximately a constant velocity.

2. A sound motion picture camera for use with a sound film carried in a cartridge chamber having a first opening and a second opening and which can be moved by handling from outside the camera for passing through the second opening after passing through the first opening, comprising:
   (a) a casing having:
       a cartridge member; and
       an image gate which is opened to said chamber at a position corresponding to an image recording location of said chamber where a first opening of a cartridge loaded into said chamber is set;
   (b) sound recording means having a sound recording head in the chamber which records sound information on said film passing along a film path within a sound recording location of said chamber where a second opening of said cartridge loaded into said chamber is set;
   (c) first feed means which is engageable with the film at the first opening of said cartridge loaded into said chamber and intermittently transports the film on said image gate in a downstream direction towards the second opening;
   (d) second feed means which has a drive shaft and a pinch roller resiliently holding the film at the second opening of the cartridge loaded into the chamber in a sandwich manner between the drive shaft and the pinch roller, wherein said second feed means is positioned together with the magnetic head within said sound recording location in such manner as being located on a downstream side of said head for ordinary running of the film along the film path formed at the sound recording location;
   (e) a motor rotating at a substantially constant speed;
   (f) means for transmitting the driving power of said motor to said drive shaft, said means having idle gear means which is provided on a shaft secured to said casing and is in gear engagement with said first gear and said second gear respectively to transmit the rotation of said first gear to said second gear;
   (g) absorption means to absorb a backlash of said first and second gears and of said idle gear means, having first elastic disc means which rotates integrally with the first gear on the same shaft with said first gear, second elastic disc means which rotates integrally with the second gear on the same shaft with said second gear and a third elastic disc means which rotates integrally with said idle gear means on the same shaft with the idle gear means and is resiliently contacted with said first elastic disc means and said second elastic disc means, respectively, the absorption means thus being arranged to allow said capstan to be rotated by the driving power of said motor at about a constant velocity.

* * * * *